O. B. FULLER.
Dough-Machines.

No. 147,762. Patented Feb. 24, 1874.

Witnesses.
Thos. S. Crane
Wm. R. Sands

Inventor:
O. B. Fuller

UNITED STATES PATENT OFFICE.

OAKLEY B. FULLER, OF NEWARK, NEW JERSEY.

IMPROVEMENT IN DOUGH-MACHINES.

Specification forming part of Letters Patent No. 147,762, dated February 24, 1874; application filed December 27, 1873.

*To all whom it may concern:*

Be it known that I, OAKLEY B. FULLER, of Newark, Essex county, New Jersey, have invented certain Improvements in Dough-Machines, of which the following is a specification:

My invention relates to that class of machinery used for making soft dough into a continuous sheet for the manufacture of cakes, &c.; and consists in an improvement in the form of the sheeting-machine patented by me November 18, 1873.

Figure 1:
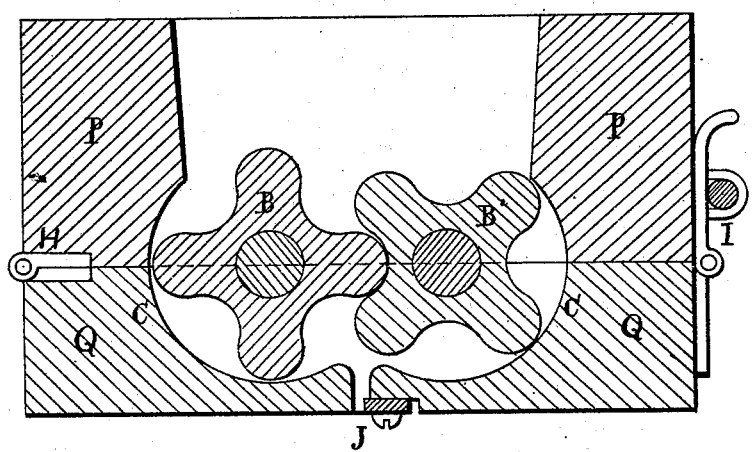
Figure 2:
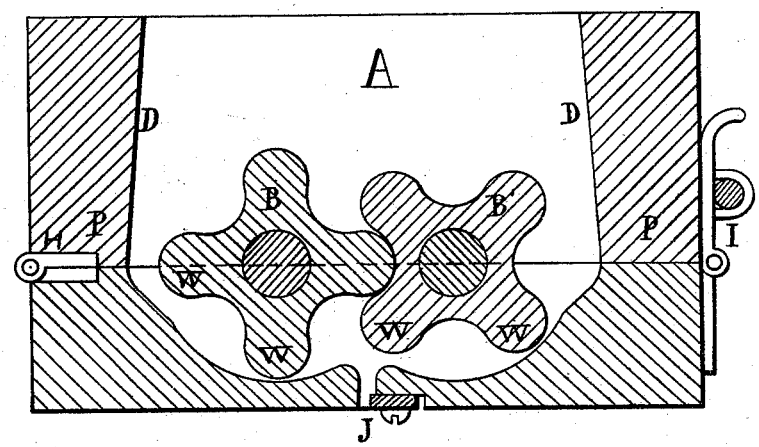

Reference is had to the accompanying drawing, in which Figure 1 is a sectional view of a sheeting-machine with my improved case, and Fig. 2 is another sectional view of a sheeting-machine with an improved hopper, A.

The same letters refer to similar parts in both figures.

The object of these improvements is to gain ready access to the interior of the machine if obstructed by any foreign substance, to provide facilities for removing the rollers readily for cleaning the machine, and to remove the retarding influence of a tapering hopper, which prevents a substance like dough from readily descending into the machine.

The original form of hopper is shown in Fig. 1, in which it will be observed that the sides D D are inclined toward one another at the bottom, so that the dough, to reach the corrugated rollers B B′, must descend through a gradually-contracting aperture. This contraction prevents it from descending readily, and I have, therefore, designed the form of hopper shown in Fig. 2, where it will be seen that the hopper D D is larger at the bottom than at the top. To accomplish this object I have reduced the bearing of the wings of the corrugated rollers upon the curved cheeks C, constructing them only long enough to cover the space between two of the wings, W W, on the corrugated rollers B B′. This enables me to widen the hopper at the bottom and still secure a large opening at the top.

Having thus stated the defects that rendered partially inoperative the machine patented by me November 18, 1873, on account of the dough failing to feed itself readily to the rollers B B, I will proceed to further describe the improvements that I have made in that machine.

To remove the rollers from the machine for cleaning, and to remove any obstructions, I construct the case in two parts, P and Q, dividing the case at the center of the rollers B B′, so that when the top of the case is removed the rollers can be lifted out readily for cleaning or repairs. To facilitate the opening of the case I provide it with a hinge, H, and catch I, or equivalent fastenings. The aperture through which the dough passes to form a sheet is shown at J, where an adjustable jaw regulates the thickness of the sheet as it emerges from the slot or throat.

I am aware that my former patent of November 18, 1873, fully covers the combination of the rolls B B′, cheeks C C, and slot, and I do not make any new claim to them; but Having described above the improvements effected in the construction of such machines, I claim, and desire to secure by Letters Patent—

1. The hopper D D, constructed largest at the bottom, in combination with the rollers B B′, as and for the purposes specified.

2. The case constructed in two parts, P and Q, and provided with a hopper, D D, constructed larger at the bottom than at the top, substantially as and for the purposes specified.

O. B. FULLER.

Witnesses:
FREDK. K. DAY,
THOS. S. CRANE.